UNITED STATES PATENT OFFICE 2,690,451

METHOD FOR PREPARATION OF SULFUR-CONTAINING ESTERS OF PHOSPHORIC ACID

Everett E. Gilbert, Flushing, and Catherine J. McGough, Kew Gardens, N. Y., assignors to Allied Chemical & Dye Corporation, New York, N. Y., a corporation of New York No Drawing. Application September 28, 1951, Serial No. 248,893

10 Claims. (Cl. 260—461)

This invention relates to new sulfur-containing esters of phosphoric acid and to the preparation of such compounds.

These new sulfur-containing phosphoric acid esters conform to the general formula

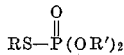

in which R represents an alkyl, substituted alkyl or cycloalkyl radical and R' represents an alkyl, substituted alkyl, cycloalkyl or alkenyl radical.

In the new compounds, typical examples of R are methyl, ethyl, normal-butyl, tertiary-butyl, betachloroethyl, triphenylmethyl and cyclohexyl. Typical examples of R' are ethyl, butyl, beta-chloroethyl, methyl, allyl and cyclohexyl.

A sulfur-containing phosphoric acid ester of the general formula given above may be prepared according to certain aspects of the invention by reacting an organic phosphite of the general formula

in which R' has the meaning shown above, either with an organic sulfonyl chloride of the general formula

or with an organic sulfenyl chloride of the general formula

in which R has the meaning shown above, and recovering said sulfur-containing phosphoric acid ester.

The reaction between the organic phosphites and the organic sulfonyl chlorides takes place in accordance with the following equation:

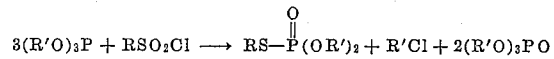

The reaction between the organic phosphites and the organic sulfenyl chlorides is represented by the following equation:

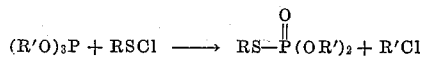

The lower trialkyl phosphites such as triethyl, tributyl and tri (betachloroethyl) phosphites are preferred reactants, but other phosphites of the general formula given above, including mixed phosphites containing different alkyl, substituted alkyl, cycloalkyl or alkenyl radicals, may be effectively employed.

It is preferred that the organic phosphite and organic sulfonyl chloride or organic sulfenyl chloride be employed in approximately stoichiometric amounts to prepare the novel sulfur-containing phosphoric acid esters of the invention.

High yields of the desired sulfur-containing esters are obtained by carrying out the reaction in the presence of an inert solvent, preferably one lower boiling than the phosphoric acid ester or esters produced. Suitable inert solvents include ethylene dichloride, ethyl ether, petroleum ether, carbon tetrachloride, toluene and benzene. When reaction is completed, lower boiling solvent so used may be recovered for reuse by simple distillation at atmospheric or lower pressure.

The reaction may be carried out at any temperature up to the decomposition point of the reactants. Generally, the reaction is quite vigorous during the addition of the reactants, and cooling is desirable to retard the reaction. In other cases, gentle warming is required to initate reaction.

As may be seen from the equation illustrating the reaction of the organic phosphites with the organic sulfonyl chlorides, phosphoric acid esters of the general formula

in which R' has the meaning shown above, are produced during the course of the reaction. These phosphoric acid esters are well known articles of commerce finding usage, for example, as solvents or plasticizers. Since heretofore, these esters have not been produced by such a reaction, their preparation constitutes another feature of our invention. The phosphoric acid esters may be separated from other reaction products by any suitable method such as by vacuum distillation usually at a temperature higher than employed for recovery of preferred lower boiling solvent.

As is apparent from the equation illustrating the reaction of the organic phosphites with the organic sulfenyl chlorides, phosphoric acid esters are not produced as by-products. Thus when the formation of by-product phosphoric acid esters is not desired, it may be preferred to produce the sulfur-containing phosphoric acid esters characteristic of the invention by use of the sulfenyl chloride reaction. When a lower trialkyl phosphite or other phosphite forming a relatively volatile organic chloride is employed in reaction with the organic sulfenyl chloride, recovery of product concentrated in sulfur-containing phosphoric acid ester may be effected easily and economically by simple heating or distillation of the reaction mass at low temperature suitable for driving off such organic chloride and solvent if present.

The following examples are given for the purpose of illustrating the present invention, but are not intended to be limiting on the scope thereof. Parts are by weight.

*Example 1.*—50 parts of triethyl phosphite were added slowly with stirring to a solution of 16 parts of normal-butanesulfonyl chloride in 84 parts of ethyl ether, the temperature being maintained below 30° C. The resulting solution was heated on a steam bath for 10 hours to complete the reaction and to remove the ether solvent and the ethyl chloride formed during the reaction. The solution was then vacuum distilled to remove first triethyl phosphate and then the sulfur-containing phosphoric acid ester having the formula

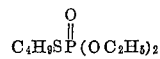

The sulfur-containing phosphoric acid ester, a colorless liquid distilling at 100° to 115° C. at 5 mm. mercury pressure, constituted 22 parts (97% of theory).

In another run, normal-butanesulfonyl chloride was reacted with tri(betachloroethyl) phosphite. The betachloroethyl chloride formed during the reaction was removed by heating, leaving a product comprising tri(betachloroethyl) phosphate and the sulfur-containing ester having the formula

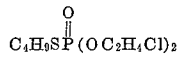

*Example 2.*—33.2 parts of triethyl phosphite were added dropwise with stirring to a solution of 24.9 parts of tertiary-butanesulfenyl chloride in 250 parts of carbon tetrachloride, the temperature being maintained below 25° C. The tertiary-butanesulfenyl chloride was prepared by the method described in Industrial and Engineering Chemistry, May 1950, page 919. The resulting solution was allowed to stand overnight at room temperature and was then heated at reflux for approximately 6 hours to remove the carbon tetrachloride solvent and the ethyl chloride formed during the reaction. The residue was fractionated, and a product comprising the sulfur-containing phosphoric acid ester having the formula

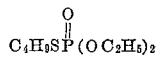

but containing no by-product triethyl phosphate was removed. The sulfur-containing phosphoric acid ester, a colorless liquid, constituted 30 parts (66% of theory).

*Example 3.*—35 parts of triethyl phosphite were added dropwise with stirring to a solution of 24.9 parts of tertiary-butanesulfenyl chloride in 200 parts of petroleum ether, the temperature being maintained below 25° C. The tertiary-butanesulfenyl chloride was prepared by the method described in Industrial and Engineering Chemistry, May 1950, page 919. The resulting solution was allowed to stand at room temperature for 48 hours and was then refluxed for 3 hours to remove the petroleum ether solvent and the ethyl chloride formed during the reaction. The residue was fractionated, and a product comprising the sulfur-containing phosphoric acid ester having the formula

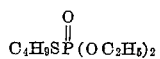

was obtained. The product, a colorless liquid, constituted 31 parts (69% theory).

Other aliphatic as well as cycloparaffinic sulfonyl and sulfenyl chlorides may be used as reactants in the above examples including methyl, ethyl and cyclohexylsulfonyl chlorides and methyl, betachloroethyl and triphenylmethylsulfenyl chlorides. Likewise, other organic phosphites, such as tributyl and tricyclohexyl phosphites may be employed in the examples.

Products of the type produced by the invention find valuable application for a number of purposes, including, but without limitation, as solvents or plasticizers, and as intermediates for a wide variety of mercaptans which are obtainable directly by hydrolysis of the novel sulfur-containing phosphoric acid esters characteristic of the invention.

We claim:

1. A method of preparing a sulfur-containing phosphoric acid ester of the general formula

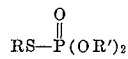

in which R is a member of the group consisting of alkyl, substituted alkyl and cycloalkyl radicals and R' is a member of the group consisting of alkyl, substituted alkyl, cycloalkyl and alkenyl radicals, which includes the step of reacting an organic phosphite of the general formula (R'O)₃P in which R' is a member of the group consisting of alkyl, substituted alkyl, cycloalkyl and alkenyl radicals, with an organic chloride of the group consisting of organic sulfonyl chlorides of the general formula

RSO₂Cl and organic sulfenyl chlorides of the general formula

RSCl

in which R is a member of the group consisting of alkyl, substituted alkyl and cycloalkyl radicals.

2. A method of preparing a sulfur-containing phosphoric acid ester of the general formula

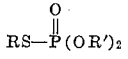

in which R is a member of the group consisting of alkyl, substituted alkyl and cycloalkyl radicals and R' is a member of the group consisting of alkyl, substituted alkyl, cycloalkyl and alkenyl radicals, which comprises reacting an organic phosphite of the general formula (R'O)₃P in which R' is a member of the group consisting of alkyl, substituted alkyl, cycloalkyl and alkenyl radicals, with an organic sulfonyl chloride of the general formula

RSO₂Cl in which R is a member of the group consisting of alkyl, substituted alkyl and cycloalkyl radicals.

3. A method of preparing a sulfur-containing phosphoric acid ester of the general formula

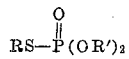

in which R is a member of the group consisting of alkyl, substituted alkyl and cycloalkyl radicals and R' is a member of the group consisting of alkyl, substituted alkyl, cycloalkyl and alkenyl radicals, which comprises reacting an organic phosphite of the general formula (R'O)₃P in which R' is a member of the group consisting of alkyl, substituted alkyl, cycloalkyl and alkenyl radicals, with an organic sulfonyl chloride of the general formula $$RSO_2Cl$$

in which R is a member of the group consisting of alkyl, substituted alkyl and cycloalkyl radicals, and recovering said sulfur-containing phosphoric acid ester from the reaction mixture.

4. The process of claim 3 in which the organic phosphite is reacted with the organic sulfonyl chloride in ratio of about 3 mols of organic phosphite to 1 mol of organic sulfonyl chloride.

5. The process of claim 4 in which the reaction is carried out in the presence of an inert solvent.

6. A method of preparing a sulfur-containing phosphoric acid ester of the general formula $$RS-\overset{O}{\underset{\|}{P}}(OR')_2$$

in which R is a member of the group consisting of alkyl, substituted alkyl and cycloalkyl radicals and R' is a member of the group consisting of alkyl, substituted alkyl, cycloalkyl and alkenyl radicals, which comprises reacting an organic phosphite of the general formula $$(R'O)_3P$$

in which R' is a member of the group consisting of alkyl, substituted alkyl, cycloalkyl and alkenyl radicals, with an organic sulfenyl chloride of the general formula $$RSCl$$

in which R is a member of the group consisting of alkyl, substituted alkyl and cycloalkyl radicals, and recovering said sulfur-containing phosphoric acid ester from the reaction mixture.

7. The process of claim 6 in which the organic phosphite is reacted with the organic sulfenyl chloride in ratio of about 1 mol of organic phosphite to 1 mol of organic sulfenyl chloride.

8. The process of claim 7 in which the reaction is carried out in the presence of an inert solvent.

9. A method of preparing the sulfur-containing phosphoric acid ester having the formula $$C_4H_9S\overset{O}{\underset{\|}{P}}(OC_2H_5)_2$$

which comprises reacting triethyl phosphite with butanesulfonyl chloride in the ratio of about 3 mols of triethyl phosphite to 1 mol of butanesulfonyl chloride in the presence of an inert solvent, and recovering said sulfur-containing phosphoric acid ester from the reaction mixture.

10. A method of preparing the sulfur-containing phosphoric acid ester having the formula $$C_4H_9S\overset{O}{\underset{\|}{P}}(OC_2H_5)_2$$

which comprises reacting triethyl phosphite with butanesulfenyl chloride in the ratio of about 1 mol of triethyl phosphite to 1 mol of butanesulfenyl chloride in the presence of an inert solvent, and recovering said sulfur-containing phosphoric acid ester from the reaction mixture.

References Cited in the file of this patent

UNITED STATES PATENTS

| Number | Name | Date |
|---|---|---|
| 2,508,364 | Bell | May 23, 1950 |
| 2,514,150 | Bell | July 4, 1950 |

OTHER REFERENCES

Pistschimuka: Ber. Deut. Chem., vol. 41, pp. 3854 to 3859 (1908).

Emmett: J. Chem. Soc., vol. 99, pp. 713 to 720 (1911).